June 6, 1950 — R. COVER — 2,510,557
CORN CUTTER BLADE SHARPENING MACHINE
Filed Jan. 15, 1946 — 3 Sheets-Sheet 1

Inventor
Ralph Cover

Inventor
Ralph Cover

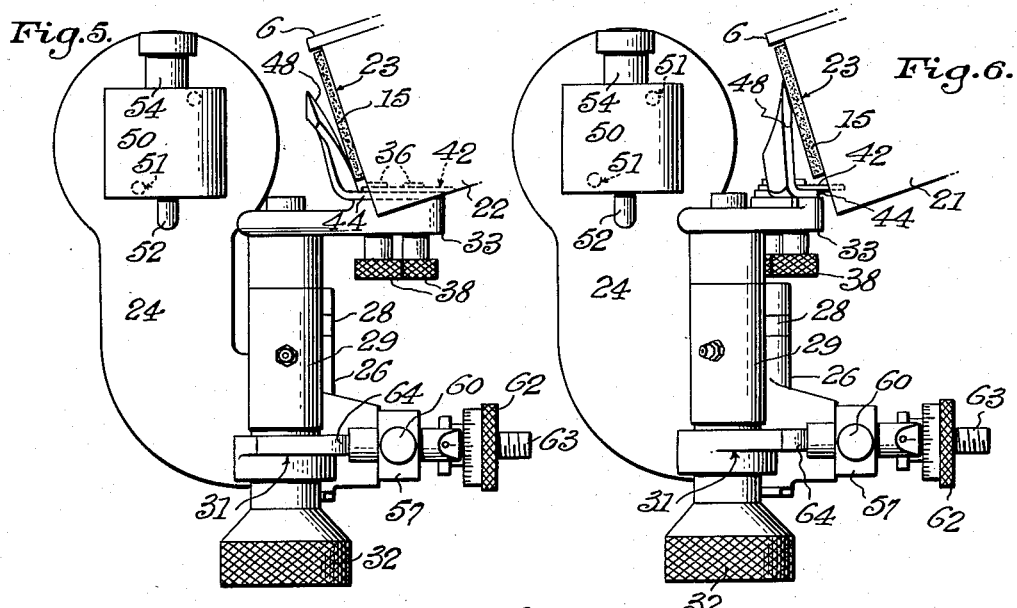

Patented June 6, 1950

2,510,557

UNITED STATES PATENT OFFICE 2,510,557

CORN CUTTER BLADE SHARPENING MACHINE

Ralph Cover, Westminster, Md.

Application January 15, 1946, Serial No. 641,260

16 Claims. (Cl. 51—96)

The invention relates generally to the art of abrading, and more particularly to edge sharpening machines, and, while subject to a more general application, it primarily seeks to provide a novel machine for rapidly and accurately sharpening the cutting edges of blades used in corn cutting machines.

An example of corn cutting machines or cutter heads of the character referred to is disclosed in U. S. Letters Patent 2,141,346 issued to Ralph Cover on December 27, 1938. In these and comparable machines, means is provided for feeding the ears of corn longitudinally through cutting means comprising a plurality of spreadable carriers with cutting blades removably mounted thereon, said blades being shaped to present curved cutting edges conforming generally to the external curvature of the corn ears and extending as partial helices about external portions of said ears, and cut depth controlling means also are provided in association with said carriers and engageable with the external surfaces of the corn ears in a manner for preventing said edges from penetrating too deeply into the corn ears during the cutting process. It will be apparent that the cutting blades must be very accurately and uniformly mounted in order to assure efficient and non-wasteful cutting of the corn, and in the setting up of the blade complements in the patented machines hereinabove referred to, the multiple of blades are brought together and accurately placed against a cylindriform gage block simulating a standard corn ear cut surface and are secured to their respective carriers while thus accurately placed. It will also be apparent that blades having cutting edges of the character stated can be sharpened only with difficulty, and unless some accurate gaging and sharpening means is provided it is impossible to sharpen the blades and maintain uniformity and accuracy in the shape of the cutting edges. It is a purpose of the present invention to provide a novel machine in which blades of the character stated can be rapidly and accurately sharpened with absolute assurance that the initially provided cutting edge shape will be maintained.

An object of the invention is to provide a machine of the character stated in which is included gaging means engageable by the cutting edge to be sharpened for accurately placing said edge, abrading means for sharpening said edge, and means for translating the blade bearing said cutting edge from the edge gaging position to a position for presenting said edge in sharpening contact with the abrading means in a manner for removing only so much of the blade metal as is necessary to be removed to sharpen said edge without changing the shape thereof.

Another object of the invention is to provide a machine of the character stated in which the gaging means is generally cylindriform in shape and the translating means includes a shaft which is rotatable in coaxial relation to the gaging surface during the gaging function and mounted in a carrier which has provision for clamping a blade thereon and is swingably mounted for translating said shaft and blade for presenting the blade to the abrading means, said shaft also being rotatable after translation thereof for presenting the edge to be sharpened against said abrading means.

Another object of the invention is to provide a machine of the character stated in which the abrading means includes a readily renewable cylindriform abrading surface, and in which there are also included a stop and a control cam engageable with the stop and rotatable with the shaft and having its contour shaped to cause the blade edge to maintain a substantially constant spaced relation to the axis of the abrading surface as the shaft is rotated to bring the cutting edge against said surface progressively throughout the length of said edge and along a line substantially paralleling the axis of the abrading surface.

Another object of the invention is to provide a machine of the character stated in which means is included for effecting a fine adjustment of the position of the cam engaged stop for controlling the amount of metal to be removed in the sharpening of each blade edge.

Another object of the invention is to provide a machine of the character stated in which provision is made for adjustably mounting the carrier to which the blade-to-be-sharpened is removably clamped so that the position of the same relative to the abrading means can be altered to change the bevel of the abrasion resulting in the provision of the desired cutting edge.

Another object of the invention is to provide in a machine of the character stated novel means for clamping the blade to the carrier in a manner providing lost motion effective to enable the blade to accurately conform to the gaging or edge placing surface while the blade is being securely clamped to the carrier.

Another object of the invention is to provide in combination with the blade edge placing and translating means, a rotor presenting a cylindriform periphery, and novel means for removably securing a thin abrading strip about said periphery in order to present a readily replaceable abrading surface for contact with the blade edges which are to be sharpened.

With the above and other objects in view that will hereinafter appear, the nature of the invention will be more clearly understood by reference to the following detailed description, the appended claims, and the several views illustrated in the accompanying drawings.

In the drawing:

Figures 5 and 6 are fragmentary plan views respectively illustrating the positions of the blade carrier at the commencement and the completion of a blade sharpening operation.

Figure 7 is a fragmentary vertical cross section taken on the line 7—7 on Figure 1.

Figure 8 is an end elevation illustrating the blade carrier.

Figure 9 is a detail perspective view of a blade.

Figure 10 is a detail perspective view of the blade clamping plate.

Figure 11 is a detail perspective view illustrating one of the blade clamping bolts, the knurled clamping nut being shown separated therefrom.

Figure 12 is a fragmentary perspective view illustrating the abrading strip inserted through the split portion of the wheel periphery prior to clamping thereof.

Figure 13 is a view similar to Figure 12 and illustrating the finally clamped and tensioned condition of the abrading strip.

Figures 1, 4:
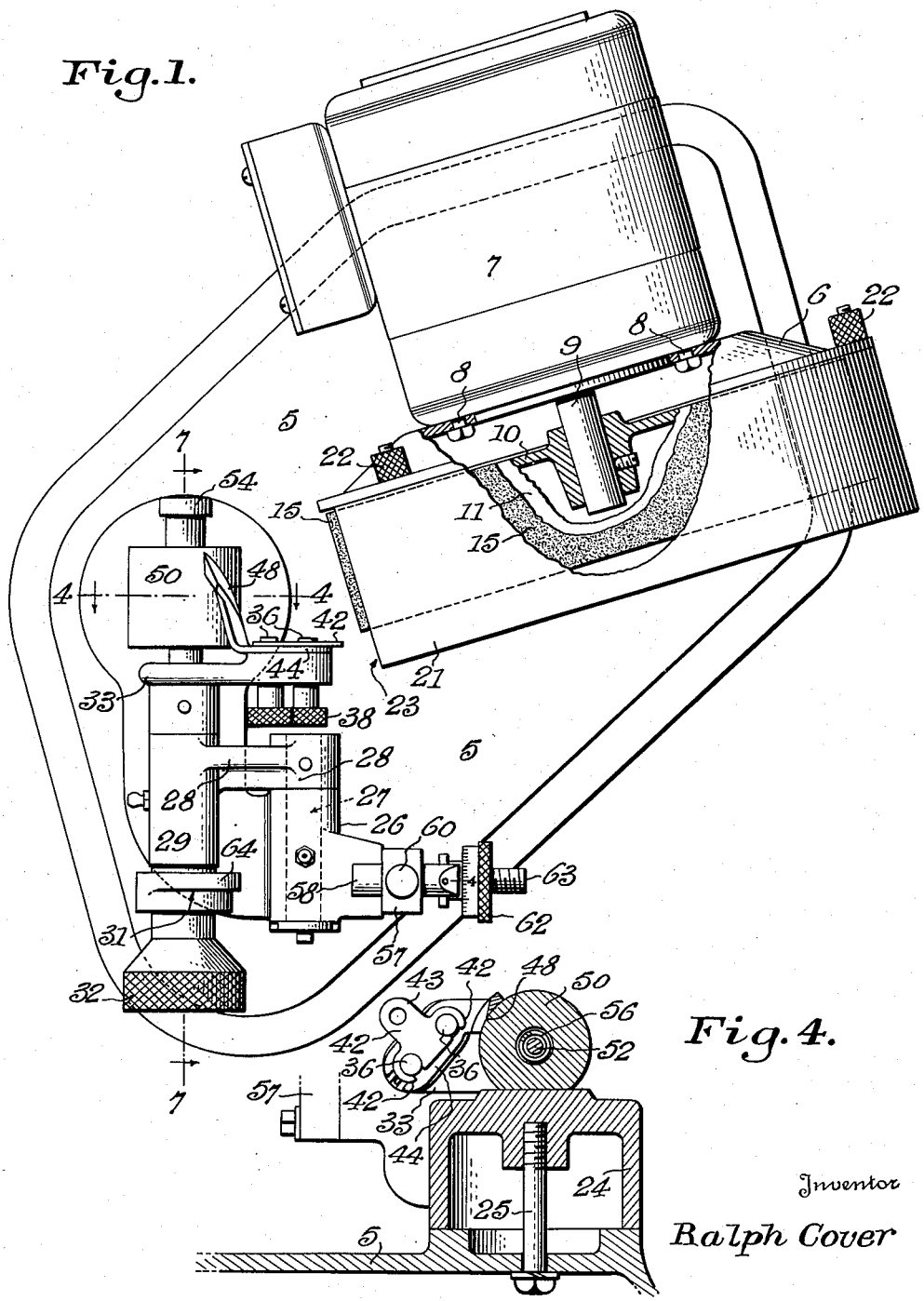
Figure 1 is a plan view, a portion of the abrading wheel guard being broken away and in section to better illustrate the mounting of the abrading wheel.
Figure 4 is a fragmentary vertical cross section taken on the line 4—4 on Figure 1.

In the example of embodiment of the invention herein disclosed, the machine is shown as including a base 5, having a support plate 6 secured thereon and extending uprightly therefrom. An electric motor 7 is secured as at 8 on the plate 6 with its shaft 9 extending through said plate.

An abrading wheel 10 is secured on the end of the shaft 9 and includes a rim 11 presenting a cylindrical peripheral surface and being split at one point in the circumference thereof as at 12. The opposing rim surfaces at the split 12 are recessed as at 13, and a threaded stud 14 projects inwardly from the rim at each side of the split in the manner best illustrated in Figures 12 and 13 of the drawings. A thin abrading band 15 of emery paper or cloth encircles the rim 11 and has its ends 16 inserted through the split 12 and oppositely lapped in the manner clearly illustrated in Figure 12. After the band is tightly fitted about the rim in the manner stated, the oppositely extended ends 16 are clamped in place by a plate 17 having forked ends 18 for straddling the threaded studs 14, knurled nuts 19 threaded onto said studs serving to securely clamp the plate in place in the manner illustrated in Figure 13. In order to additionally tension the band about the abrading wheel rim, a tensioning pin 20 having a tapered end is inserted between the ends of the abrading strip and into the receiving recess formed between opposing wheel edge recesses 13.

A guard 21 may be mounted over the abrading wheel and removably secured as at 22 to the support plate 6, and said guard is provided with a peripheral cut-out 23, the purpose of which will be described hereinafter.

Figure 2:
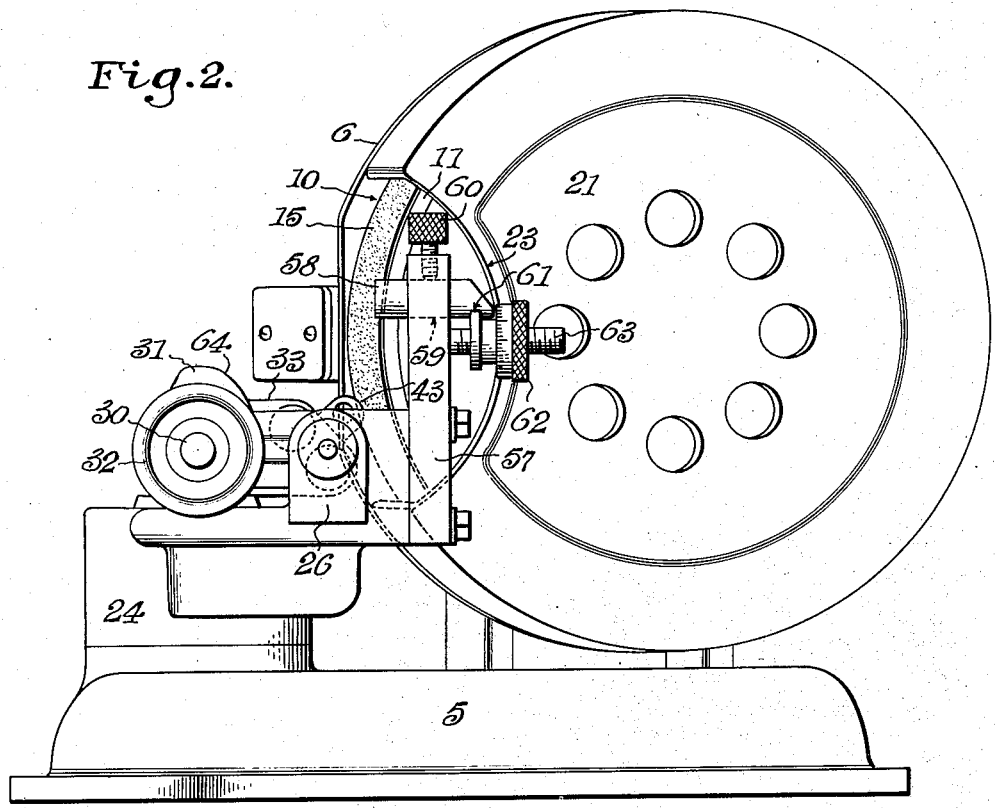
Figure 2 is a side elevation, the blade carrier being shown in the blade gaging position in full lines.

On the base 5 is mounted a support casting 24 which is adjustably clamped on the base as at 25 so as to be adjustable about a vertical axis in the manner clearly illustrated in Figure 4. A post bearing 26 extends upwardly from the casting 24 and provides a bearing for a horizontally disposed rocker shaft 27 whereon a carrier arm 28 is secured in the manner clearly illustrated in Figures 1 and 2 of the drawings.

The carrier arm 28 is equipped with a bearing 29 at its free end for rotatably supporting a shaft 30 in parallel relation to the previously mentioned rocker shaft 27. The shaft 30 extends at both ends from the bearing 29 and is equipped at one end with a cam 31 and a knurled turning head 32 both secured on said shaft, and at its other end with a blade mounting arm 33, also secured thereon so as to be swung about as the shaft 30 is turned by manipulation of the turning head 32.

The blade mounting arm is equipped with a pair of apertures 34, and the outer face of said arm is equipped with a kerf or slot 35 disposed to intersect both apertures. The apertures 34 are adapted to loosely receive blade mounting bolts 36 having reduced, externally threaded shanks 37 which extend inwardly through the apertures 34 to receive knurled clamping nuts 38. The bolt heads are equipped with annular grooves 39 near the outer ends thereof and cross pins 40 which are engageable in the slot 35 in a manner for preventing turning of the bolt heads in the mounting arm apertures 34. See Figures 8 and 11.

The grooves 39 near the ends of the bolt heads are adapted to receive the forked ends 41 of a blade clamping plate 42 having an extended finger piece 43. See Figure 10. One of the blades to be sharpened is illustrated in detail in Figure 9, and each said blade includes a body 44 having an aperture 45 and a forked end 46 freely mountable over the securing bolts 36. It is to be understood that in attaching the blades to the mounting arm 33, the aperture 45 and the forked end portion 46 of the blade are slipped over the heads of the bolts 36, the forked ends of the clamping plate 42 are slipped into the grooves 39 in said bolt heads, and the knurled nuts 38 are tightened to draw the plate 42 against the body 44 of the blade and the blade body against the opposing face of the mounting arm 33. Each blade includes a cutting blade extension having a nose 47 and a cutting edge 48 which is slightly undercut at its inner face and beveled at its outer face and so shaped as to form a part of a helix.

It will be apparent by reference to Figure 7 that the end of the shaft 30 on which the blade mounting arm 33 is secured is equipped with an axial end socket 49 which is disposed opposite the center of a generally cylindriform gage block 50 which is secured as at 51 on the casting 24. A spring plunger 52 is slidable in a bearing 53 in the block 50, and said plunger has a finger piece 54 at its outer end and has its other or inner end disposed for being engageable in the shaft end socket 49 for holding the shaft 30 and the gage block 50 in axial alignment. An abutment is secured on the socket engaging end of the plunger 52, and a compression spring 56 encircles the plunger between said abutment and the plunger bearing in a manner for constantly tending to project the socket engaging end of said plunger.

A post 57 is attached to and extends upwardly from the post bearing 26 and carries a stop pin 58 which is slidably mounted in a bearing 59 provided therefor in said post. By reason of the slidable mounting of the stop pin, its position in the post can be altered, and in order to secure the stop pin in its positions of adjustment, a set screw 60 is provided. The undersurface of the stop pin end projecting through the post 57 is grooved as at 61 to receive an annular flange provided on an adjuster nut 62 which is threadably mounted on a fixed pin 63 projecting from the post 57.

The previously mentioned cam 31 secured on the rotatably mounted shaft 30 includes a control cam surface 64 which is disposed to engage the stop pin 58 and so shaped as to be effective during the turning of the knurled head 32 in the process of sharpening the cutting edge of a blade to control presentation of said edge to the abrading wheel in a manner for assuring that only so much of the metal of the blade 9 will be removed as is absolutely essential to the proper sharpening of said edge. In other words, the cam surface is effective to control the sharpening of the blades in a manner for enabling rapid and accurate sharpening without undesirably changing the shape of the cutting edge.

In the sharpening of a blade, the blade is attached to the mounting arm 33 by slipping the aperture 45 and the forked end 46 of the blade body 44 over the heads of the bolts 36, the clamping plate 42 first having been removed. After the blade is thus mounted, the clamping plate 42 is mounted by slipping the forked ends 41 thereof into the bolt head grooves 39, and with the nuts 38 still in a loose condition, the blade mounting arm 33 is positioned in the blade gaging or cutting edge placing position illustrated in full lines in Figures 1 and 2, that is with the spring plunger 52 engaged in the shaft end socket 49 so as to hold the shaft 30 and the gage block 50 in axial alignment. With the parts in this position, the operator presses a finger upon the extending end of the cutter blade so as to accurately conform the blade curvature to the external gaging surface block 50, and with the blade thus accurately placed the nuts 38 are tightened to securely clamp the blade in proper position. The loose mounting of the heads of the bolts 36 in the apertures 34 of the mounting arm 33, and the loose fitting of the blade body aperture 45 and forked end 46 over said loosely mounted bolt heads provide sufficient lost motion or play in the blade mounting prior to tightening of the nuts 38 to allow the curved cutting edge on the blade extension to accurately adapt itself to the external or gaging surface of the gage block 50. In order to additionally assure proper placement of blade cutting edge on, or conformity thereof with the external gage block surface, the shaft 30 may be rocked back and forth during the blade gaging function by manipulation of the knurled turning head 32.

Figure 3:
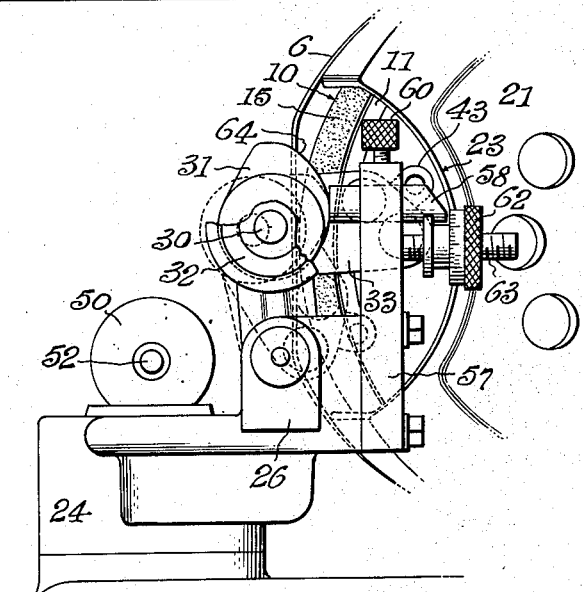
Figure 3 is a fragmentary side elevation illustrating the blade carrier in the blade sharpening position, the blade positioning cam being shown in engagement with the stop for controlling the commencement of a sharpening operation in full lines, and in engagement with said stop in the position assumed by the cam at the completion of a sharpening operation in dotted lines.

After the blade has been accurately gaged in the manner hereinabove described, the plunger 52 is retracted to withdraw the end thereof from the end socket 49 in the shaft 30 so as to enable swinging of the blade mounting arm 33 about the axis of the rocker shaft 27 to place the cam surface 64 against the stop pin 58 in the manner clearly illustrated in Figure 3 of the drawings. The stop pin 58 is properly adjusted by manipulation of the adjuster nut 62 so as to permit only such contact of the blade cutting edge portion as will be necessary to sharpen the same without excessive removal of metal therefrom. By now turning the knurled head 32, the shaft 30 can be suitably rocked to present the cutting edge of the blade to the rapidly rotating abrading wheel, and the control surface 64 of the cam 31 will control progressive presentation and sharpening of the cutting edge from heel to tip without removal of any more metal than is necessary to provide the desired sharpening, thereby assuring against unintentional alteration of the shape of the cutting edge.

It will be observed by reference to Figure 1 of the drawings that the support casting 24 is so placed as to present the shafts 27 and 30 in angular relation to the axis of the abrading wheel 10 so as to provide a proper bevel on the blade being sharpened, and it will be obvious that by adjusting the casting about its clamping pivot 25, the angle of the bevel can be altered.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, an abrading wheel presenting a cylindriform abrading surface, means for rotating said wheel, a shaft disposed in angular relation to the axis of said wheel, a blade carrier arm secured to and projecting from said shaft and having means thereon for supporting a blade including a mounting head removably attachable to said supporting means and extending in transverse relation to said shaft and a body portion extending in the general direction of the axis of said shaft and having a curved cutting edge forming a part of a helix, an arm on which said shaft has rotary bearing, means swingably supporting said arm in position for adapting it to move the shaft and a blade carried by the carrier arm toward and from the abrading surface, a gage block having a gage surface at least in part cylindriform and extending with its axis parallel said shaft and with which said cutting edge will conform to place the blade in a predetermined position with relation to said abrading surface when the swingably mounted arm is moved away from the abrading surface and into position for placing the blade body against said gage surface, means for adjustably clamping the blade mounting head on the carrier arm in the gage surface determined position and for maintaining said position as said swingably mounted arm is moved to present the cutting edge to the abrading surface to be sharpened thereby, and means for rotating said shaft to cause the cutting edge to engage the abrading surface progressively throughout the length of said edge.

2. Apparatus as defined in claim 1 in which the shaft, the carrier arm, the swingably mounted arm and the gage block are mounted on a common support which is adjustably mounted so that the angular relation of the shaft and the gage block gage surface axes can be altered to vary the angle of the bevel formed by the abrading action of the abrading surface incidental to the sharpening of the cutting edge of the blade.

3. Apparatus as defined in claim 1 in which is included means for securing the swingably mounted arm in position with the shaft and gage surface in axial alignment during the accurate positioning of the blade, and in which the shaft can be rotated while so secured to move the cutting edge about on said gage surface to facilitate accurate placement thereof.

4. Apparatus as defined in claim 1 in which there are included a stop member, and a cam movable with the shaft and having a control surface engageable with said stop for controlling progressive presentation of the moving helical cutting edge to the abrading surface in a manner for bringing about the removal of only so much of the cutting edge as is necessary to be removed to sharpen said edge without changing its curvature.

5. In apparatus for forming sharp edges on blades each of which includes a mounting body and a blade extension curved in the form of a portion of a helix, an abrading wheel, means for rotating the wheel, a carrier arm, means pivotally supporting said arm for swinging movement toward and from said wheel, a blade carrier member rockably mounted on the arm at a position spaced from the arm pivot and having thereon a finger piece by which swinging movement can be imparted to said arm and rocking movement to said carrier member, means for removably attaching a blade to the carrier member in position for presenting the curved extension thereof to the wheel when the arm is swung toward the wheel and the carrier is rocked by manipulation of said finger piece, stop means, and a cam on the carrier member and engageable with the stop means for limiting movement of the arm toward the wheel and shaped to cause the curved blade extension to engage in helix portion edge contact with the wheel to be sharpened thereby.

6. Apparatus as defined in claim 5 in which the axis of the wheel and the axis about which the carrier member is rockable bear angular relation one to the other so that engagement of the curved blade extension with the abrading wheel results in the sharpening of the helical portion edge in the form of a bevel.

7. Apparatus as defined in claim 5 in which means are provided for adjusting the position of the stop means to provide for the removing of a greater or lesser amount of metal during the process of sharpening a blade.

8. Apparatus as defined in claim 7 in which the stop means includes a pin slidably mounted on a fixed support and having a transverse groove therein, and a threadably mounted adjuster sleeve having a flange engaging in said groove and effective when rotated to adjust the position of said pin to provide for the removing of a greater or lesser amount of metal during the process of sharpening a blade.

9. Apparatus as defined in claim 5 in which there is included means presenting a gaging surface against which the curved extension of a blade can be accurately placed by proper swinging of the arm into position with the blade thereon and finger pressure of the blade extension against said gaging surface incidental to final and secure attachment of the blade body to the carrier member so that after final and secure attachment of the blade body to the carrier member while the curved blade extension is in contact with the gaging surface and the swinging of the arm toward the abrading wheel said blade extension will be presented in accurate predetermined relation to said wheel.

10. Apparatus as defined in claim 5 in which there is included means presenting a gaging surface against which the curved extension of a blade can be accurately placed by proper swinging of the arm into position with the blade thereon and finger pressure of the blade extension against said gaging surface incidental to final and secure attachment of the blade body to the carrier member so that after final and secure attachment of the blade body to the carrier member while the curved blade extension is in contact with the gaging surface and the swinging of the arm toward the abrading wheel said blade extension will be presented in accurate predetermined relation to said wheel, said gaging surface being at least in part cylindrical where it is to be engaged by the curved blade extension and the arm being swingable to present the rockable carrier member in coaxial relation to the cylindrical surface so that the curved blade extension can be turned about over and in contact with said at least in part cylindrical surface during the accurate placement of the blade.

11. Apparatus as defined in claim 5 in which there is included means presenting a gaging surface against which the curved extension of a blade can be accurately placed by proper swinging of the arm into position with the blade thereon and finger pressure of the blade extension against said gaging surface incidental to final and secure attachment of the blade body to the carrier member so that after final and secure attachment of the blade body to the carrier member while the curved blade extension is in contact with the gaging surface and the swinging of the arm toward the abrading wheel said blade extension will be presented in accurate predetermined relation to said wheel, said gaging surface being at least in part cylindrical where it is to be engaged by the curved blade extension and the arm being swingable to present the rockable carrier member in coaxial relation to the cylindrical surface so that the curved blade extension can be turned about over and in contact with said at least in part cylindrical surface during the accurate placement of the blade, means also being provided for securing the rockable carrier member and the gaging means in said coaxial relation during the accurate placement of the blade, and the blade attaching means including securing devices providing lost motion when loosened during the gaging and placement of the blade and which when tightened after said gaging and placement with the curved blade extension in engagement with the gaging surface will secure the blade for accurate presentation to the abrading wheel.

12. Apparatus as defined in claim 5 in which there is included means presenting a gaging surface against which the curved extension of a blade can be accurately placed by proper swinging of the arm into position with the blade thereon and finger pressure of the blade extension against said gaging surface incidental to final and secure attachment of the blade body to the carrier member so that after final and secure attachment of the blade body to the carrier member while the curved blade extension is in contact with the gaging surface and the swinging of the arm toward the abrading wheel said blade extension will be presented in accurate predetermined relation to said wheel, said gaging surface being at least in part cylindrical where it is to be engaged by the curved blade extension and the arm being swingable to present the rockable carrier member in coaxial relation to the cylindrical surface so that the curved blade extension can be turned about over and in contact with said at least in part cylindrical surface during the accurate placement of the blade, means also being provided for securing the rockable carrier member and the gaging means in said coaxial relation during the accurate placement of the blade, and the blade attaching means including securing devices providing lost motion when loosened during the gaging and placement of the blade and which when tightened after said gaging and placement with the curved blade extension in engagement with the gaging surface will secure the blade for accurate presentation to the abrading wheel, said swingable arm, said stop means, said carrier member and said gaging means being mounted on a common support which is adjustable to provide for variations in the angular relation of the axis of the abrading wheel and the rockable carrier member and the degree of bevel formed in the sharpening of a blade.

13. In apparatus for sharpening a blade having a body and a blade extension forming part of a helix, an abrading wheel presenting a cylindrical abrading surface, a carrier, means for loosely supporting a blade body on said carrier, a stationary gaging means presenting a gaging surface which is at least in part cylindrical and bears fixed predetermined relation to said abrading surface, means for moving said carrier in a fixed path for presenting said blade extension for accurate placement against said at least in part cylindrical gaging surface, means for securely clamping the blade body against the carrier with the blade extension accurately gaged against said gaging surface, said carrier moving means being then movable for translating said carrier while maintaining said gaged blade extension position to present the blade extension in sharpening contact with the abrading surface, adjustable stop means for limiting presentation of said blade extension in sharpening contact with the abrading surface so as to assure removal of only so much of the blade extension metal as is necessary to be removed to sharpen the desired helical edge thereon, and means for imparting rotary movement to the carrier with the blade extension in contact with said abrading surface.

14. In apparatus for sharpening a blade having a body and a blade extension forming part of a helix, an abrading wheel presenting a cylindrical abrading surface, a carrier, means for loosely supporting a blade body on said carrier, a stationary gaging means presenting a gaging surface which is at least in part cylindrical and bears fixed predetermined relation to said abrading surface, means for moving said carrier in a fixed path for presenting said blade extension for accurate placement against said at least in part cylindrical gaging surface, means for securely clamping the blade body against the carrier with the blade extension accurately gaged against said gaging surface, said carrier moving means being then movable for translating said carrier while maintaining said gaged blade extension position to present the blade extension in sharpening contact with the abrading surface, adjustable stop means for limiting presentation of said blade extension in sharpening contact with the abrading surface so as to assure removal of only so much of the blade extension metal as is necessary to be removed to sharpen the desired helical edge thereon, and means for imparting rotary movement to the carrier with the blade extension in contact with said abrading surface, said last named means including a shaped cam turnable against said stop means as the carrier is being turned to progressively present the blade extension against the abrading surface and provide the sharpened part helical edge with the desired lead.

15. Apparatus as defined in claim 5 in which the axis of the wheel and the axis about which the carrier member is rockable bear angular relation one to the other so that engagement of the curved blade extension with the abrading wheel results in the sharpening of the helical portion edge in the form of a bevel, means also being provided for varying the angular relation of said wheel axis and said axis about which the carrier is rockable, thereby to vary the degree of bevel to be formed in sharpening the blade.

16. In apparatus for sharpening blades each having a cutting edge forming a part of a helix, an abrading wheel presenting a cylindriform abrading surface, means for rotating said wheel, a support arm, means supporting the arm for oscillation in a direction for moving the free end of the arm toward or from said abrading surface, a blade carrier supported at the free end of said arm for rotation about an axis bearing acute angular relation to the abrading surface, means for supporting a blade on the carrier with its helical edge projecting in the general direction of said axis, and a finger knob attached to said carrier and engageable for oscillating the arm and for rotating the carrier with the helical blade edge in contact with said abrading surface.

RALPH COVER.

REFERENCES CITED

The following references are of record in the file of this patent:

UNITED STATES PATENTS

| Number | Name | Date |
| --- | --- | --- |
| 504,000 | Thiel et al. | Aug. 29, 1893 |
| 766,978 | Symington | Aug. 9, 1904 |
| 1,296,979 | Lindsay | Mar. 11, 1919 |
| 1,302,724 | Solem | May 6, 1919 |
| 1,427,900 | Hughes | Sept. 5, 1922 |
| 1,640,993 | Hanson | Aug. 30, 1927 |
| 1,987,832 | Knight | Jan. 15, 1935 |
| 2,041,340 | Hartman | May 19, 1936 |
| 2,130,575 | Adams | Sept. 20, 1938 |
| 2,202,587 | Kitchen | May 28, 1940 |
| 2,322,868 | Misiura | June 29, 1943 |
| 2,331,381 | Ekstedt | Oct. 12, 1943 |
| 2,344,550 | Knowlton | Mar. 21, 1944 |
| 2,345,161 | Thomason | Mar. 28, 1944 |